United States Patent
Shimizu et al.

(10) Patent No.: US 10,164,228 B2
(45) Date of Patent: *Dec. 25, 2018

(54) SEALED TYPE BATTERY

(71) Applicant: SANYO ELECTRIC CO., LTD., Osaka (JP)

(72) Inventors: Keisuke Shimizu, Osaka (JP); Masato Fujikawa, Osaka (JP); Tomohiko Yokoyama, Osaka (JP); Kyosuke Miyata, Osaka (JP); Koki Inoue, Osaka (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/795,875

(22) Filed: Oct. 27, 2017

(65) Prior Publication Data

US 2018/0053924 A1    Feb. 22, 2018

Related U.S. Application Data

(63) Continuation of application No. 14/429,292, filed as application No. PCT/JP2013/005715 on Sep. 26, 2013, now Pat. No. 9,831,479.

(30) Foreign Application Priority Data

Sep. 26, 2012 (JP) .................. 2012-211701

(51) Int. Cl.
*H01M 2/12* (2006.01)
*H01M 2/04* (2006.01)
(Continued)

(52) U.S. Cl.
CPC ....... *H01M 2/1241* (2013.01); *H01M 2/0408* (2013.01); *H01M 2/0478* (2013.01);
(Continued)

(58) Field of Classification Search
CPC .. H01M 2/022; H01M 2/0408; H01M 2/0413; H01M 2/046; H01M 2/1229;
(Continued)

(56) References Cited

U.S. PATENT DOCUMENTS 9,831,479 B2 * 11/2017 Shimizu .............. H01M 2/0408
2004/0038126 A1   2/2004 Gu
(Continued)

FOREIGN PATENT DOCUMENTS

CN    1487613 A    4/2004
CN    2798318 Y    7/2006
(Continued)

OTHER PUBLICATIONS

International Search Report of PCT application No. PCT/JP2013/005715 dated Nov. 19, 2013.
(Continued)

*Primary Examiner* — Ula C Ruddock
*Assistant Examiner* — Matthew W Van Oudenaren
(74) *Attorney, Agent, or Firm* — McDermott Will & Emery LLP

(57) ABSTRACT

The battery is sealed by a sealing member including a safety valve for exhausting the gas generated in the battery to the outside of the battery when the pressure in the battery is increased. A part of the sealing member is formed of a member having a melting point lower than that of high-temperature gas generated in the abnormal time and having a ratio of an area of an opening of the battery case to an area of a gas exhaust hole is $3.0\times10^{-5}$ or more and $9.1\times10^{-3}$ or less.

12 Claims, 7 Drawing Sheets

(51) Int. Cl.
*H01M 2/16* (2006.01)
*H01M 2/02* (2006.01)

(52) U.S. Cl.
CPC .......... *H01M 2/1673* (2013.01); *H01M 2/022* (2013.01); *H01M 2/046* (2013.01); *H01M 2/0413* (2013.01); *H01M 2/127* (2013.01); *H01M 2/1229* (2013.01); *H01M 2/1264* (2013.01); *H01M 2/1282* (2013.01); *H01M 2/1294* (2013.01); *H01M 2002/0297* (2013.01); *H01M 2200/10* (2013.01); *H01M 2200/20* (2013.01)

(58) Field of Classification Search
CPC ............. H01M 2/1241; H01M 2/1264; H01M 2/1282; H01M 2/1294; H01M 2/127; H01M 2002/0297
See application file for complete search history.

(56) References Cited

U.S. PATENT DOCUMENTS

| | | | | |
|---|---|---|---|---|
| 2005/0277017 | A1* | 12/2005 | Cho | H01M 2/023 429/56 |
| 2007/0199748 | A1* | 8/2007 | Ross, VII | B60G 3/20 180/65.51 |
| 2009/0208820 | A1* | 8/2009 | Nishino | H01M 2/1235 429/56 |
| 2011/0064979 | A1* | 3/2011 | Yokoyama | H01M 2/0413 429/82 |
| 2013/0059181 | A1* | 3/2013 | LePort | H01M 2/022 429/89 |

FOREIGN PATENT DOCUMENTS

| | | |
|---|---|---|
| JP | 06-333548 A | 12/1994 |
| JP | 10-092406 A | 4/1998 |
| JP | 10-308206 A | 11/1998 |
| JP | 11-250884 A | 9/1999 |

OTHER PUBLICATIONS

English Translation of Chinese Search Report dated Jul. 6, 2016 for the related Chinese Patent Application No. 201380049703.7.
Non-Final Office Action issued in U.S. Appl. No. 14/429,292, dated Jan. 17, 2017.
Notice of Allowance issued in U.S. Appl. No. 14/429,292, dated Aug. 2, 2017.

* cited by examiner

SEALED TYPE BATTERY

RELATED APPLICATIONS

This application is a Continuation of U.S. patent application Ser. No. 14/429,292, filed on Mar. 18, 2015, now U.S. Pat. No. 9,831,479, which is a U.S. National Phase under 35U.S.C. § 371 of International patent application No. PCT/JP2013/005715, filed on Sep. 26, 2013, which in turn claims the benefit of Japanese Application No. 2012-211701, filed on Sep. 26, 2012, the entire disclosures of which Applications are incorporated by reference herein.

TECHNICAL FIELD

The present invention relates to a battery sealed by a sealing member including a safety valve through which gas generated in the battery is exhausted to the outside of the battery when the pressure in the battery is increased.

BACKGROUND ART

A sealed type secondary battery that can be charged and discharged has a high energy density. Therefore, an abnormal charge/discharge reaction or chemical reaction occurs in the battery, resulting in generation of gas, when such a battery is used for a long time in high temperature environments, or when an internal or external short circuit occurs, or when abnormal heating, abnormal impact, or the like, occurs. Accordingly, a battery case may swell or even explode.

In order to solve such problems, Patent Literature 1 describes a sealed type battery including a safety valve in a sealing member. According to PTL 1, the safety valve in the sealing member breaks due to a rapid increase in the pressure in the battery, and gas in the battery is exhausted through a gas exhaust hole in a battery lid to the outside of the battery. Thus, the battery case can be prevented from swelling and exploding.

CITATION LIST

Patent Literature

PTL 1: Japanese Patent Unexamined Publication No. H10-092406

SUMMARY OF THE INVENTION

Even during normal use, a safety valve operates due to an increase in the pressure in a battery according to storage at a high temperature or repeated charge and discharge, and an electrolyte and inflammable gas may be exhausted from the safety valve of the battery. Furthermore, even in the abnormal time, in the early stage of the abnormal time, gas is slowly generated in the battery, and the electrolyte and the inflammable gas are exhausted from the safety valve. Only when the abnormal state further continues, a reaction in the battery proceeds to reach a stage in which gas is rapidly generated, and consequently, high-temperature gas is exhausted from the safety valve.

According to the technology described in PTL 1, the battery case can be prevented from swelling and exploding by exhausting the gas generated in the battery to the outside of the battery. However, when the safety valve operates in the storage at a high temperature during normal use or by repeated charge and discharge, or in the early stage of an abnormal time, the electrolyte and the inflammable gas exhausted from the battery may scatter widely around the battery.

In view of the foregoing problems, the present invention has been made. A main object of the present invention is to provide a sealed type battery that is excellent in safety and capable of preventing an electrolyte and inflammable gas exhausted during normal use or in the early stage of an abnormal time from scattering widely, while reliably exhausting high-temperature gas to the outside of the battery in a stage in which gas is rapidly generated in the abnormal time.

A sealed type battery in accordance with one exemplary embodiment includes a case housing an electrode assembly produced by placing a positive electrode and a negative electrode with a separator interposed between the positive electrode and the negative electrode; and a sealing member disposed to an opening of the case and including a plurality of members each including at least one gas exhaust hole. Among the gas exhaust holes respectively formed in the plurality of members, a member including a gas exhaust hole having a ratio of an area of the gas exhaust hole to an area of the opening of the case of $3.0 \times 10^{-5}$ or more and $9.1 \times 10^{-3}$ or less is formed of a member having a melting point lower than a melting point of high-temperature gas generated in an abnormal time.

This configuration can provide a sealed battery that is excellent in safety and capable of reliably exhausting the gas generated in the battery to the outside of the battery and minimizing an adverse effect on a device equipped with the battery.

DESCRIPTION OF EMBODIMENTS

Hereinafter, the exemplary embodiments of the present invention are decried with reference to drawings. Note here that the present invention is not limited to the following exemplary embodiments. Furthermore, various modifications can be made to the exemplary embodiments within the scope of the present invention. The exemplary embodiment may be combined with the other exemplary embodiments.

Figure 1:
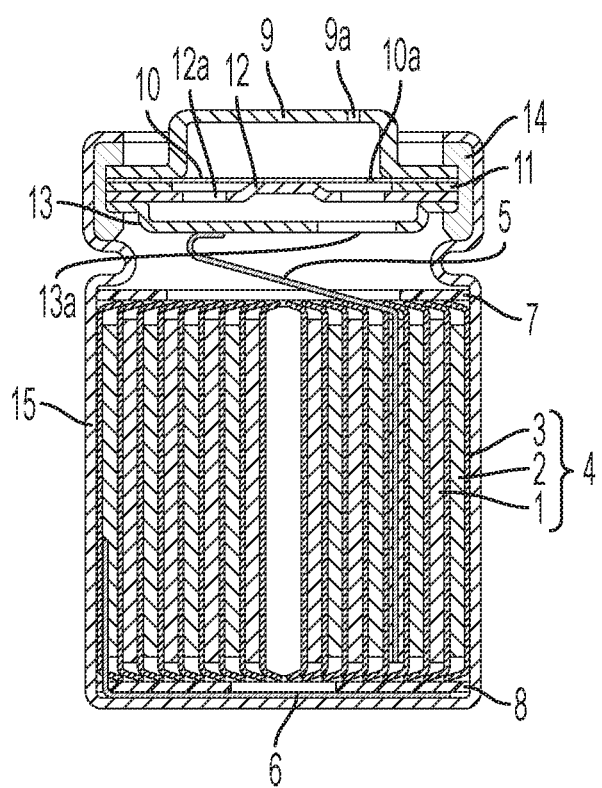
FIG. 1 is a sectional view of a cylindrical non-aqueous electrolyte secondary battery in accordance with one exemplary embodiment of the present invention.

FIG. 1 is a sectional view showing a configuration of a cylindrical non-aqueous electrolyte secondary battery in accordance with one exemplary embodiment of the present invention.

As shown in FIG. 1, electrode assembly 4 including positive electrode 1 and negative electrode 2 wound with separator (porous insulating layer) 3 interposed therebetween is housed in bottomed cylindrical battery case 15 together with a non-aqueous electrolyte (not shown). Ring-shaped insulating plates 7 and 8 are disposed to upper and lower parts of electrode assembly 4, respectively. Positive electrode 1 is coupled to filter 13 through positive electrode lead 5, and negative electrode 2 is coupled to a bottom portion of battery case 15, which also works as a negative electrode terminal, through negative electrode lead 6.

Filter 13 is connected to inner cap 12, and a protruding portion of inner cap 12 is coupled to valve member 10 made of metal. Furthermore, valve member 10 is connected to cap 9 which also works as a positive electrode terminal. Cap 9, valve member 10, inner cap 12, and filter 13 integrally constitute a sealing member to seal an opening of battery case 15 through gasket 14. Note here that at least one of cap 9, valve member 10, inner cap 12 and filter 13 constituting the sealing member is formed of a different member.

Valve member 10 includes thin portion 10a that breaks when the pressure in the battery reaches a predetermined value. Breaking of thin portion 10a allows valve member 10 to function as a safety valve. Breaking of thin portion 10a of valve member 10 allows gas generated in the battery and the electrolyte to be exhausted to the outside of the battery through filter opening 13a of filter 13, inner cap opening 12a of inner cap 12, a break portion of valve member 10, and cap opening 9a of cap 9.

Figure 2A:
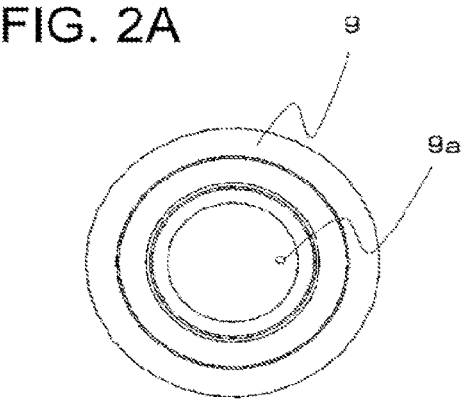
FIGS. 2A and 2B are plan views respectively showing shapes of a cap and a filter in accordance with one exemplary embodiment of the present invention.
Figure 2B:
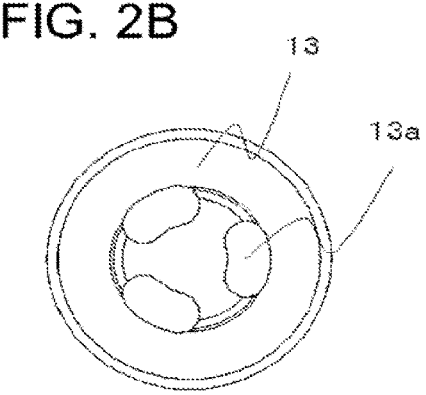

FIGS. 2A and 2B are plan views respectively showing shapes of a cap and a filter in accordance with this exemplary embodiment.

As shown in FIG. 2A, cap 9 is formed of aluminum whose melting point is 700° C. or less, which is lower than the melting point of high-temperature gas generated in abnormal situations. An opening area of cap opening 9a is $7.9 \times 10^{-3}$ mm$^2$ or more and 2.4 mm$^2$ or less. When the opening area of cap opening 9a is set to less than $7.9 \times 10^{-3}$ mm$^2$, gas is not easily exhausted in the early stage of generation of gas, and the pressure in the battery may be increased by the gas, resulting in deformation and explosion of the sealing member. When the opening area of cap opening 9a is set to 2.4 mm$^2$ or more, the electrolyte and the inflammable gas, exhausted when the safety valve operates in the early stage of generation of gas, cannot be prevented by cap opening 9a, and may scatter to the outside of the battery. Furthermore, a plurality of cap openings 9a may exist as long as the opening area of cap openings 9a falls within the above-mentioned range. The exemplary embodiment of the present invention describes an example in which one cap opening 9a is formed and the opening area of cap opening 9a is 0.8 mm$^2$.

Furthermore, as shown in FIG. 2B, an opening area of filter opening 13a formed in filter 13 is 32.3 mm$^2$. The opening area of filter opening 13a in this Example falls within the range of the general opening area of a cylindrical lithium ion secondary battery having the 18650 size (diameter: 18 mm and height: 65 mm) currently available in the market.

Furthermore, an area of the break portion formed in valve member 10 when thin portion 10a of valve member 10 brakes and an opening area of inner cap opening 12a of inner cap 12 are larger than the opening area of cap opening 9a formed in cap 9. An area of a gas exhaust passage in the sealing member is determined by the opening area of cap opening 9a that is an exhaust hole formed in cap 9.

Furthermore, the opening area of cap opening 9a corresponds to gas exhaust capability in the early stage of generation of gas, and depends on the size of the opening of battery case 15. Therefore, when the opening of battery case 15 is changed, the area of cap opening 9a is also changed. It is therefore preferable that the ratio of the area of cap opening 9a to the area (260 mm$^2$) of the opening of battery case 15 is $3.0 \times 10^{-5}$ or more and $9.1 \times 10^{-3}$ or less.

Figure 3A:
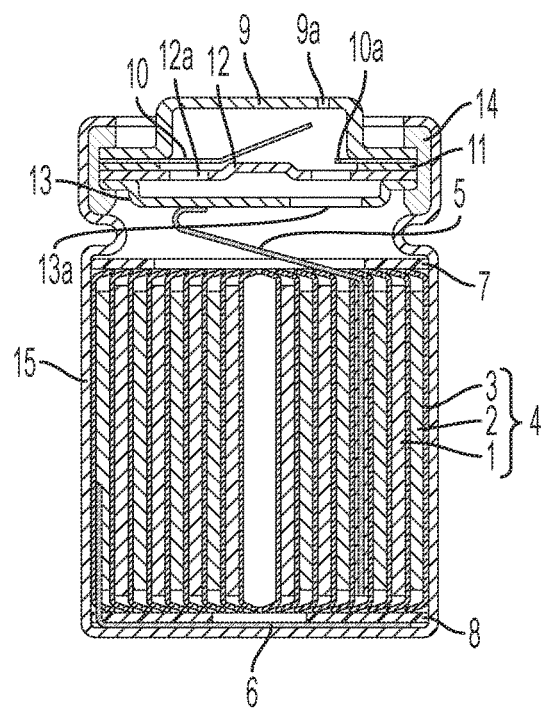
FIGS. 3A and 3B are sectional views each showing a process of exhausting gas to the outside of the battery in accordance with one exemplary embodiment of the present invention.
Figure 3B:
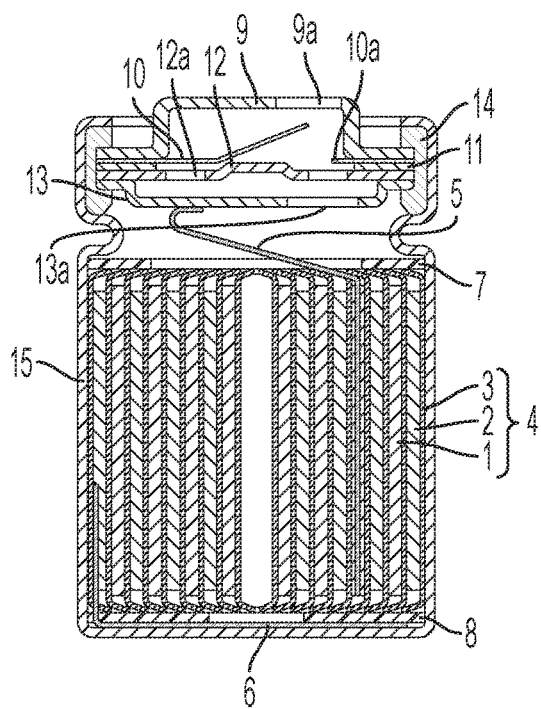

FIGS. 3A and 3B are sectional views each showing a process of exhausting gas to the outside of the battery in accordance with this exemplary embodiment. With reference to FIGS. 3A and 3B, the process of exhausting gas to the outside of the battery in this exemplary embodiment is described.

FIG. 3A is a view showing a state in which valve member 10 as a safety valve operates in the early stage of generation of gas. The temperature of the battery is gradually increased by overcharge or the like, and the electrolyte in sealed battery case 15 is, for example, vaporized or decomposed. Then, the pressure in the battery exceeds the operating pressure of the safety valve (breaking pressure of thin portion 10a), thin portion 10a of valve member 10 breaks. Thus, the pressure in the battery is released to the outside of the battery through filter opening 13a of filter 13, inner cap opening 12a of inner cap 12, the break portion of valve member 10, and cap opening 9a of cap 9. In this stage, relatively low temperature gas is generated slowly. When valve member 10 breaks, the electrolyte and the inflammable gas are slowly exhausted to the outside of the battery through an extremely small exhaust area in cap opening 9a as an exhaust hole of cap 9.

FIG. 3B is a view showing a state in which cap 9 melts due to high-temperature gas in a stage in which an abnormal state further continues in the battery, a rapid chemical reaction occurs in the battery, and the high-temperature gas is rapidly generated. In this stage, cap 9 melts due to heat from the high-temperature gas ejected in large quantities to form an exhaust hole having an expended opening area. Thus, the high-temperature gas rapidly generated in the battery is exhausted to the outside of the battery through the exhaust hole, having an extended opening area, formed by the melting of cap 9.

With such a configuration, during normal use or in the stage in which a relatively low temperature gas is generated slowly in the abnormal time, the electrolyte and the inflammable gas exhausted from the battery when the safety valve operates are exhausted through cap opening 9a as an extremely small exhaust hole. Consequently, it is possible to prevent the electrolyte and the inflammable gas from scattering widely and causing an adverse effect on a device equipped with the battery. Furthermore, in the stage in which the abnormal state continues in the battery and the high-temperature gas is rapidly generated in the battery, cap 9 melts due to heat of the high-temperature gas ejected, and the high-temperature gas rapidly generated in the battery is reliably exhausted to the outside of the battery through the exhaust hole, having an extended opening area, formed by the melting of cap 9. As a result, it is possible to achieve a sealed battery that is excellent in safety and capable of preventing the electrolyte and the inflammable gas exhausted during normal use or in the early stage of the abnormal time from scattering widely so as to minimize an adverse effect on a device equipped with the battery, while reliably exhausting the high-temperature gas in the stage in which gas is rapidly generated in the abnormal time to the outside of the battery.

Furthermore, the "safety valve" in the present invention includes a mechanism having a function of exhausting the gas, generated in the battery to the outside of the battery when the pressure in the battery is increased, and is not necessarily limited to the configuration described in this exemplary embodiment. Examples of the other configurations of the safety valve include a configuration in which a battery is sealed by a gasket or packing that breaks at a predetermined pressure, a configuration in which a battery is sealed by a resilient member such as resin or a spring urged to the opening, and gas is exhausted from a space generated due to deformation of the resilient member by an increase in the internal pressure, when the internal pressure is increased, or the like.

Figure 4:
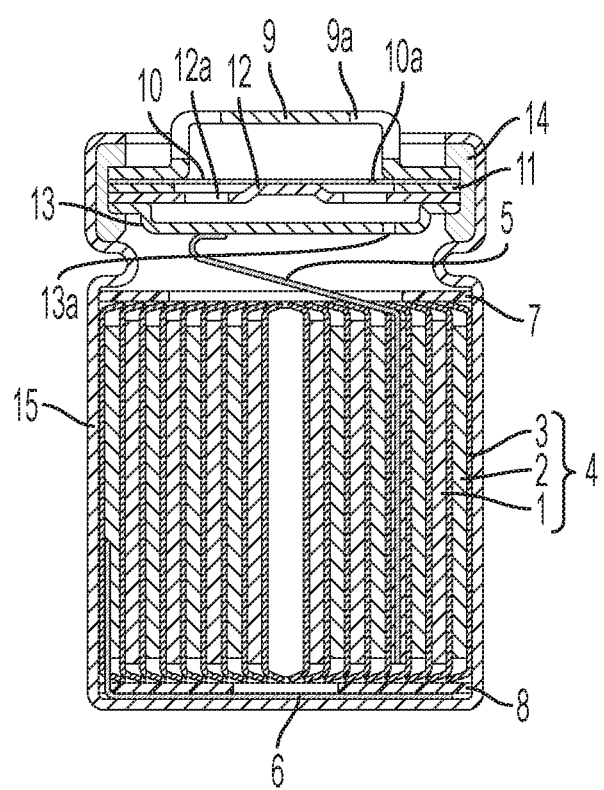
FIG. 4 is a sectional view of a cylindrical non-aqueous electrolyte secondary battery in accordance with another exemplary embodiment of the present invention.
Figure 5A:
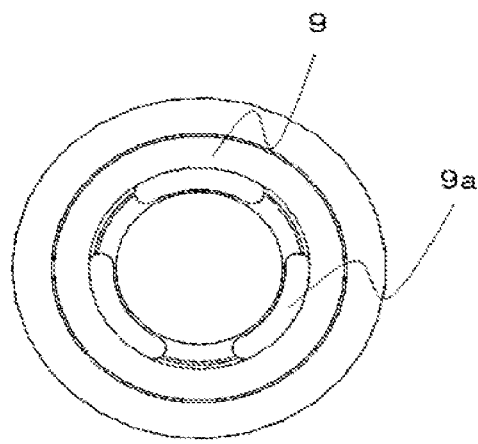
FIGS. 5A and 5B are plan views respectively showing shapes of a cap and a filter in accordance with another exemplary embodiment of the present invention.
Figure 5B:
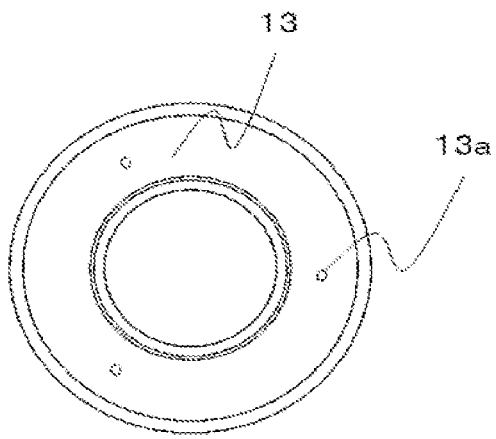

Next, with reference to referring FIG. 4 and FIGS. 5A and 5B, a case in which a gas exhaust hole is formed in a filter as a part of a sealing member in accordance with another exemplary embodiment. FIG. 4 is a sectional view of a cylindrical non-aqueous electrolyte secondary battery in accordance with this exemplary embodiment. FIGS. 5A and 5B are plan views respectively showing shapes of a cap and a filter in accordance with this exemplary embodiment.

As shown in FIG. 4 and FIG. 5B, filter 13 is provided with filter opening 13a as a gas exhaust hole. Filter 13 is made of aluminum (melting point: 660° C.) as a material having a melting point of 700° C. or less which is lower than the melting point of high-temperature gas generated in the abnormal time.

An opening area of filter opening 13a of filter 13 is $7.9 \times 10^{-3}$ mm$^2$ or more and 2.4 mm$^2$ or less. When the opening area of filter opening 13a is less than $7.9 \times 10^{-3}$ mm$^2$, gas is not easily exhausted in the early stage of generation of gas, and the pressure in the battery may be increased by the gas, resulting in deformation and explosion of the sealing member. When the opening area of filter opening 13a is set to 2.4 mm$^2$ or more, the electrolyte and the inflammable gas, exhausted when the safety valve operates in the early stage of generation of gas, cannot be prevented by filter opening 13a, and may scatter to the outside of the battery. Furthermore, a plurality of filter openings 13a may exist as long as the opening area of filter openings 13a falls within the above-mentioned range. The exemplary embodiment of the present invention describes an example in which three filter openings 13a are formed and the opening area of three filter openings 13a in total is 1.5 mm$^2$. Furthermore, as shown in FIG. 5A, an opening area of cap opening 9a formed in cap 9 is 34.9 mm$^2$. The opening area of the opening area of cap opening 9a of this Example falls within the range of the general opening area of a cylindrical lithium ion secondary battery having the 18650 size currently available in the market. Furthermore, an opening area of inner cap opening 12a of inner cap 12 and an area of a break portion formed in valve member 10 when thin portion 10a of valve member 10 brakes are larger than the opening area of filter opening 13a formed in filter 13. An area of a gas exhaust passage in the sealing member is determined by the opening area of filter opening 13a formed in filter 13. Furthermore, the opening area of filter opening 13a corresponds to gas exhaust capability in the early stage of generation of gas, and depends on the size of the opening of battery case 15, a volume of the battery case, or the like. Therefore, when an area of the opening of battery case 15 (260 mm$^2$) is changed, the area of filter opening 13a is also changed. It is therefore preferable that the ratio of the area of filter opening 13a to the area of the opening of battery case 15 is $3.0 \times 10^{-5}$ or more and $9.1 \times 10^{-3}$ or less.

Figure 6A:
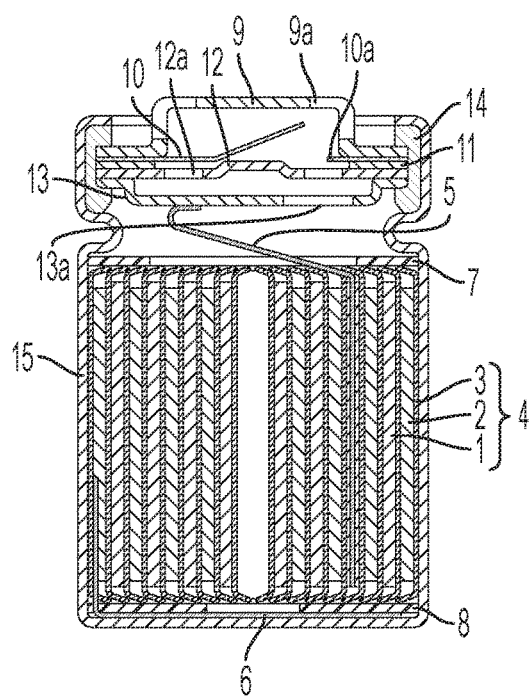
FIGS. 6A and 6B are sectional views each showing a process of exhausting gas to the outside of the battery in accordance with another exemplary embodiment of the present invention.
Figure 6B:
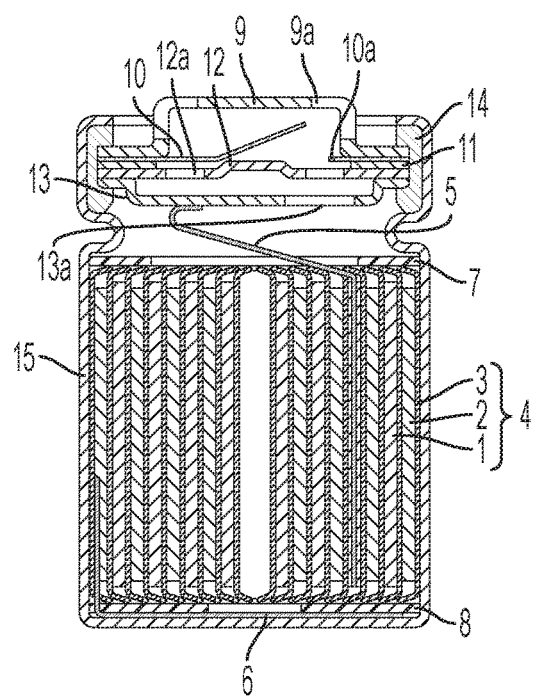

FIGS. 6A and 6B are sectional views each showing a process of exhausting gas to the outside of the battery in accordance with this exemplary embodiment. With reference to FIGS. 6A and 6B, the process of exhausting gas to the outside of the battery in this exemplary embodiment is described.

FIG. 6A is a view showing a state in which thin portion 10a of valve member 10 breaks and valve member 10 as a safety valve operates in an early stage of generation of gas. In this state, the electrolyte and the inflammable gas in the battery are slowly exhausted through the extremely small area in filter opening 13a of filter 13 as the exhaust hole to the outside of the battery. FIG. 6B is a view showing a state in which filter 13 melts due to the high-temperature gas generated in a stage in which an abnormal state further continues in the battery, a rapid chemical reaction occurs in the battery, and high-temperature gas is rapidly generated. In this configuration, filter 13 is a sealing member component located nearest to the battery inside and exposed to heat of the high-temperature gas when the high-temperature gas is generated in the battery. Therefore, filter opening 13a as the exhaust hole melts more reliably, and an exhaust passage having an extended opening area can be formed. Thus, in the stage in which gas is rapidly generated in the abnormal time, the high-temperature gas can be exhausted to the outside of the battery more reliably.

Figure 7:
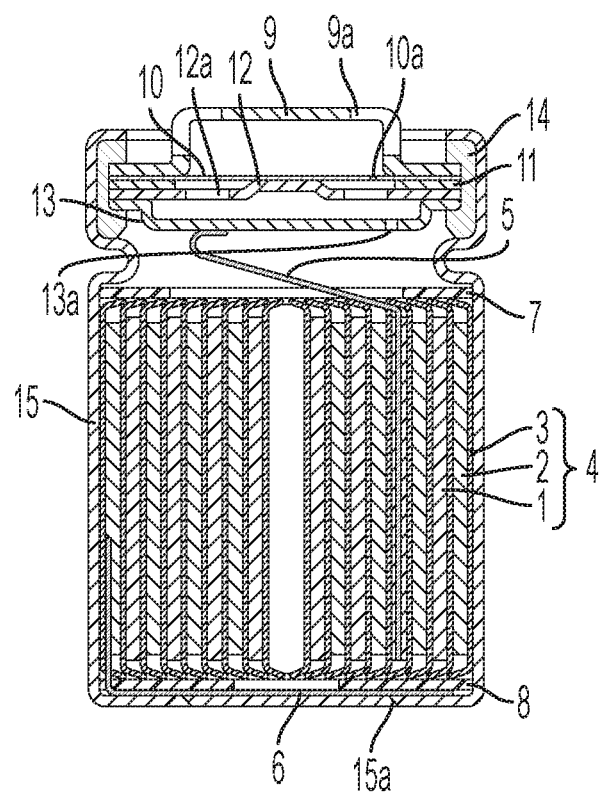
FIG. 7 is a sectional view of a cylindrical non-aqueous electrolyte secondary battery in accordance with still another exemplary embodiment of the present invention.
Figure 8:
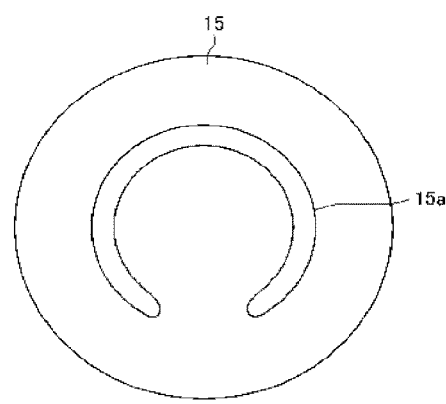
FIG. 8 is a bottom view of the cylindrical non-aqueous electrolyte secondary battery in accordance with still another exemplary embodiment of the present invention.

Next, with reference to FIGS. 7 and 8, a still another exemplary embodiment of the present invention is described. Herein, in addition to the safety valve provided in a sealing member, a second safety valve having a higher operating pressure than that of the safety valve provided in the sealing member is provided. FIG. 7 is a sectional view of a cylindrical non-aqueous electrolyte secondary battery in accordance with this exemplary embodiment. FIG. 8 is a bottom view of the cylindrical non-aqueous electrolyte secondary battery in accordance with this exemplary embodiment.

As shown in FIGS. 7 and 8, thin portion 15a that brakes when the pressure in the battery reaches a predetermined value is formed in the bottom portion of battery case 15. Thin portion 15a formed in the bottom portion of battery case 15 forms the second safety valve. Herein, the breaking pressure of thin portion 15a formed in the bottom portion of battery case 15 is larger than the operating pressure of the safety valve provided in the sealing member. With this configuration, in the case where time delay occurs between the generation of the high-temperature gas and the melting of the exhaust hole due to the heat of the gas in the stage in which the high-temperature gas is rapidly generated in the battery, when the pressure in the battery exceeds the operating pressure of the second safety valve, thin portion 15a of battery case 15 breaks. Consequently, the high-temperature gas generated in the battery is exhausted to the outside of the battery through the break portion in battery case 15. Also in the case where the high-temperature gas does not reach 700° C., so that the exhaust hole does not melt and a sufficient gas exhaust passage is not formed in the sealing member, the high-temperature gas generated in the battery is similarly exhausted to the outside of the battery through the break portion of battery case 15. Thus, in the stage in which gas is rapidly generated in the abnormal time, the high-temperature gas can be exhausted to the outside of the battery more reliably.

Furthermore, the operating pressure of the safety valve provided in the sealing member and the operating pressure of the second safety valve are not uniquely determined, and may be appropriately determined with a type of the battery used, an assumed gas-generation mode (a pressure-increase mode), and the like, taken into consideration. Note here that the operating pressure of the second safety valve is set lower than pressure resistance of the battery case (or pressure resistance of the sealing member), and is preferably set to 2 MPa or more and less than 8 MPa. When the second operating pressure is set to less than 2 MPa, even when a battery receives some small impact such as dropping, the thin portion in the bottom of the case breaks and the electrolyte may leak out of the battery. Furthermore, when the second operating pressure is set to 8 MPa or more, break of the thin portion in the bottom of the case delays with respect to the rapid generation of gas, and deformation and explosion of the sealing member may occur in the battery.

Note here that the case where the exhaust hole does not melt include a case where a part of the exhaust hole does not melt and is left, and a sufficient gas exhaust passage is not formed in the sealing member.

As mentioned above, the present invention has been described with reference to the preferable suitable embodiments. However, the invention should not be construed to be limited to such descriptions, and various modifications can be made thereto. For example, the above-mentioned exemplary embodiments describe a non-aqueous electrolyte secondary battery as an example of the sealed battery, but the present invention is not limited to this alone, and can be also applied to, for example, a lead storage battery, a nickel cadmium secondary battery, a nickel hydrogen secondary battery, an alkaline dry battery, and the like. Furthermore, the type of the non-aqueous electrolyte secondary battery is not particularly limited. The present invention can also be applied to, for example, a lithium ion secondary battery, and a lithium primary battery.

INDUSTRIAL APPLICABILITY

A sealed type battery of the present invention is suitably used as a power supply for electronic devices such as personal computer, and a portable telephone, an electric vehicle, a power tool, or the like.

The invention claimed is:

1. A capping member for sealing an opening of a battery case, comprising a plurality of members,
wherein at least one of the plurality of members includes a gas exhaust hole, and
a ratio of an area of the gas exhaust hole to an area of the opening of the battery case is $3.0 \times 10^{-5}$ or more and $9.1 \times 10^{-3}$ or less.

2. The capping member of claim 1, wherein:
the capping member includes a cap and a filter,
the cap constitutes an outer package of a battery together with the battery case,
the filter is coupled to a positive electrode housed in the battery case, through a positive electrode lead, and
the gas exhaust hole is formed in the cap or filter.

3. The capping member of claim 2, wherein the cap or filter includes a plurality of the gas exhaust holes.

4. The capping member of claim 3, wherein
a ratio of a total area of the plurality of the gas exhaust holes to the area of the opening of the battery case is $3.0 \times 10^{-5}$ or more and $9.1 \times 10^{-3}$ or less.

5. The capping member of claim 1, wherein the member including the gas exhaust hole is formed of a member having a melting point lower than a temperature of high-temperature gas generated in an abnormal time.

6. The capping member of claim 5, wherein the cap or filter having the gas exhaust hole is formed of aluminum.

7. The capping member of claim 1, wherein a member in which the gas exhaust hole is not formed, among the plurality of members, includes an opening, and an opening area of the opening is larger than the opening area of the gas exhaust hole.

8. A battery comprising:
the battery case housing an electrode assembly produced by placing a positive electrode and a negative electrode with a separator interposed between the positive electrode and the negative electrode;
the capping member of claim 1, disposed to the opening of the battery case, and
a safety valve, which breaks when a pressure in the battery reaches a predetermined value, in a bottom portion of the battery case,
wherein the capping member includes a valve member,
the valve member has a thin portion which breaks when a pressure in the battery reaches a predetermined value different from the predetermined value of the safety valve, and
the predetermined value of the safety valve is larger than the predetermined value of the valve member.

9. The battery of claim 8, wherein the predetermined value of the safety valve is lower than a pressure resistant value of a portion excluding the safety valve of the battery case or a pressure resistant value of the capping member.

10. The battery of claim 9, wherein the predetermined value of the safety valve is 2 MPa or more and less than 8 MPa.

11. An electric vehicle comprising a battery which has the capping member of claim 1.

12. An electric vehicle comprising the battery of claim 8.

* * * * *